April 21, 1931.  J. W. PAGE  1,802,063
EXCAVATING APPARATUS
Filed March 7, 1930  2 Sheets-Sheet 1
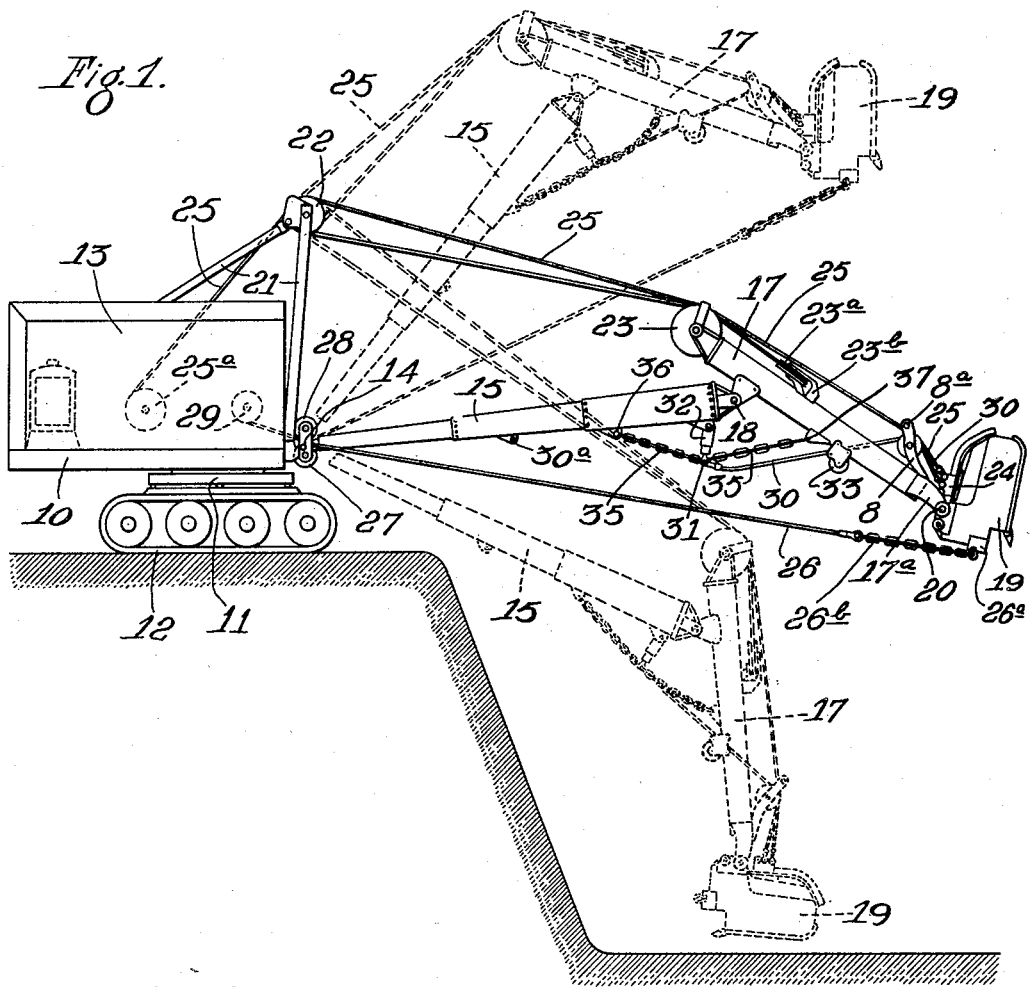
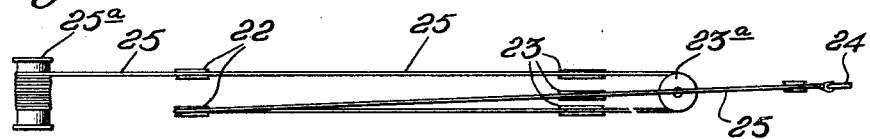
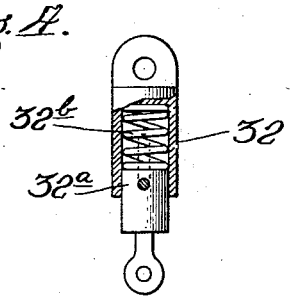
Inventor:
John W. Page.
By Dyrenforth, Lee, Chritton and Wiles
Attys.

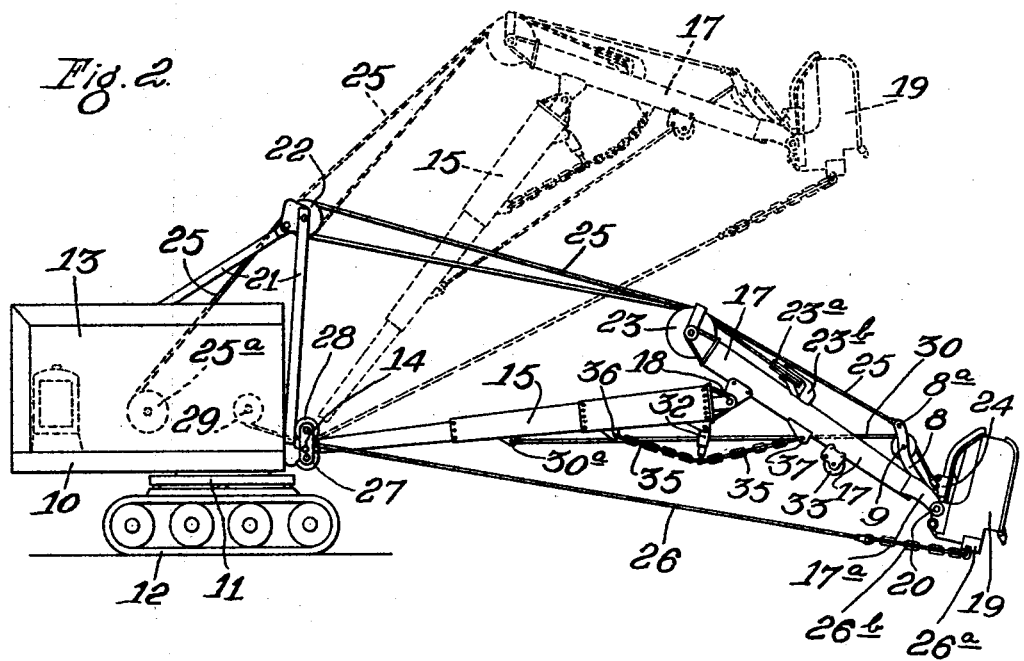

Patented Apr. 21, 1931

1,802,063

UNITED STATES PATENT OFFICE

JOHN W. PAGE, OF CHICAGO, ILLINOIS

EXCAVATING APPARATUS

Application filed March 7, 1930. Serial No. 433,926.

This invention relates to improvements in excavating apparatus and, more especially, to such apparatus sometimes referred to as a drag shovel, trench hoe, or similar device, constructed to dig toward the operator's cab instead of away from it.

My improved apparatus is of the same general type as that shown in my United States patent, No. 1,724,104, issued August 13, 1929, and has certain improvements over the apparatus therein shown. In this specification, I shall more particularly point out such improvements, it being understood that, in other respects, the construction and operation, in general, resemble that of the apparatus shown in the earlier patent referred to.

In those forms of devices embodying the features of my invention shown in the accompanying drawings—

Figure 1 is a view in side elevation; and Fig. 2 is a similar view showing a modification; Fig. 3 is a diagrammatic view, showing the reaving of the boom line; and Fig. 4 is a vertical sectional view of the snubber brace.

As shown in the drawings, 10 indicates a suitable platform of the ordinary type rotatably mounted by means of the turntable 11 on suitable traction members, for example, the caterpillar track 12. The platform 10 is adapted to support the driving machinery (not shown) which may be any suitable motor. Numeral 13 indicates a suitable housing for the mechanism mounted on the platform 10, and the operator.

Pivotally attached at 14 to the front of the platform 10 in the usual manner is a boom 15.

Numeral 17 indicates a bucket-arm pivotally attached to the end of the boom 15 at 18, such point of attachment being a short distance below the upper end of the arm 17. The lower end of the arm 17 is forked as indicated by 17$^a$, the prongs of the forks carrying pivotally mounted therebetween a bucket 19 which may be the general type of Page bucket now in common use in excavating apparatus. The pivot points at which the bucket 19 is carried by the end of the arm are indicated by 20, 20 and these pivot points preferably are in front of the center of gravity of the bucket.

Numeral 21 indicates a frame mounted on the platform 10 with a double sheave 22 at its apex. The upper end of the arm 17 is also provided with a triple sheave 23.

The bucket 19 carries on top a plate 24, substantially in line with the pivot 20 and behind the same. This plate is provided with a series (here shown as three) of perforations, or eyes, for attaching the ends of the boom line (or hoist line), and the dump line to be hereinafter described.

Numeral 25 indicates a line which I may herein call the boom line, although in practice the same is sometimes referred to as the hoist line. This line has one end attached to the winch, or winding drum 25$^a$, on the platform 10. This line 25 extends from the winding drum 25$^a$ up over one of the sheaves 22 at the top of the frame 21, thence over one of the sheaves 23 at the upper end of the arm 17, thence down and around the sheave 23$^a$, mounted in a flat position, as shown, on top of the arm 17, by the bracket 23$^b$, on the opposite side from the pivot 18 and preferably in a position somewhat lower than said pivot. After passing around the sheave 23$^a$, the line 25 again goes back and up over another one of the sheaves 23, thence back, up and around the other sheave 22, thence down again, and up over the third sheave 23, whence the line goes down parallel with the arm 17, over the same, with its end attached (as shown in Fig. 1) to one of the eyes, or holes, in the plate 24. This weaving of the line 25 is diagrammatically shown in Fig. 3. Close to the point of attachment of the lower end of the line, the same may pass over one sheave of a double sheave 9 carried by a double arm, or bracket 8, attached to the lower end of the arm 17.

Numeral 26 indicates a loading line, attached to the hitch plates of the shovel 26$^a$, preferably by means of a bridle chain 26$^b$. The other end of the loading line 26 passes over the roller 27 and under the roller 28, and thence is led to the winch, or winding drum 29 mounted on the platform 10.

Numeral 30 indicates a dump line, having its inner end attached at 31 to the lower end of a snubber brace 32, carried by the outer end of the boom 15. This dump line 30 passes over a sheave 33, carried on the under side of the arm 17, thence over one sheave of the double sheave 9, carried at the lower end of the arm 17, and has its other, or outer, end attached to one of the holes, or eyes, in the plate 24.

Numeral 35 indicates a snubber chain having its inner end attached at 36 to the under side of the boom, and its outer end attached at 37 to the under side of the arm 17, said chain passing over and connected to the snubber brace 32. This chain is of such a length as to limit the extension or straightening of the arm 17 on the pivot 18. For example, the limit of this movement may be as shown in Fig. 1 in solid lines. The snubber brace 32 is preferably provided with a telescopic member 32ª resting against a spring 32ᵇ in order to provide a certain amount of give or resiliency against jerks on the dump line or snubber chain.

I shall now point out more particularly some of the advantages in the apparatus shown over the apparatus of my prior patent above referred to.

With the reaving of the boom line 25 as herein shown, it will be seen that the same passes over the tops of all three sheaves 23 on the upper end of the bucket arm 17. With this construction, the pull is in line with, or over the tops of said sheaves, and not in line with the center thereof, as shown in older forms of apparatus. This pull over the tops of said sheaves gives a better leverage in unbending or extending the bucket arm, particularly in the upper positions of the boom 15, and permits a greater lift or extension of the arm 17.

It is to be noted also that the passing of the line 25 around the sheave 23ª (in flat position) on top of the arm 17 braces the arm. This sheave 23ª may be mounted on the arm wherever the bracing is desired, and is here shown as placed somewhat below a position directly opposite the pivot 18.

In the operation of the apparatus, the dumping of the bucket may be effected by proper slackening of tension on the loading line 26 in the manner described in my earlier patent, No. 1,724,104 above referred to, or the dump line 30 alone may be relied upon to cause such dumping when the arm 17 is extended or straightened out to its limit. In such case, the dump line 30 is made with just sufficient length so that it will become taut and dump the bucket when the arm 17 is extended to its limit.

The construction and operation of the modified form of device shown in Fig. 2 are substantially the same as that already described, with certain exceptions that will be noted.

In describing this other form of apparatus, I have used the same reference numerals to indicate similar parts. In fact, the structure is substantially the same, and it might be said that Fig. 2 merely shows other manners of connecting or operating certain parts.

As shown in Fig. 2, the bracket 8 carried by the lower end of the arm 17 is provided with an extension 8ª, to the end of which the lower end of the boom line 25 is attached, instead of being attached to the plate 24 on the bucket 19. When the boom line 25 is thus attached, dumping is not effected in the manner described in my earlier patent, No. 1,704,104, but such dumping is obtained solely by means of the dump line 30, when the arm 17 reaches the limit of its extension. The outer end of this dump line 30 is attached to the plate 24, and the inner end may be attached to the snubber 32 as shown in Fig. 1, or directly to the boom 15, as shown in Fig. 2, said attachment being indicated by 30ª.

In the claims, when generally stating that the boom line is attached to the lower end of the bucket arm (without specifying that the same is attached directly to the arm, or to the bucket) I mean to include such attachment as shown in both Fig. 1 and Fig. 2. That is, in speaking of such attachment, generally or broadly, I mean that the line is attached either directly to the arm, as shown in Fig. 2, or to the bucket, as shown in Fig. 1, in the latter case, the attachment to the arm being effected through the bucket.

It is to be noted also that although I have shown the boom line 25 passed around the sheave 23ª and its end attached to the lower end of the bucket arm, to provide two attachments to the bucket arm, such attachments could be reversed and the sheave provided at the lower end of the bucket arm with the end of the line 25 attached to the bucket arm, at a point intermediate the ends thereof.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. Apparatus of the character described, including; a platform; a boom pivotally attached to the platform; a bucket arm pivotally attached to the outer end of the boom, said pivotal attachment being below the upper end of said bucket arm; a bucket mounted on the lower end of the bucket arm; a loading line attached to the bucket; means on the platform for hauling in the loading line; a plurality of sheaves on the upper end of the bucket arm; a boom line leading from the platform over the tops only of all the sheaves on the upper end of the bucket arm, with its outer end attached to the lower end of the bucket arm; and means on the platform for hauling in the boom line.

2. Apparatus of the character described, including; a platform; a boom pivotally attached to the platform; a bucket arm pivotally attached to the outer end of the boom, said pivotal attachment being below the upper end of said bucket arm; a bucket mounted on the lower end of the bucket arm; a loading line attached to the bucket; means on the platform for hauling in the loading line; a sheave supported on the platform; a plurality of sheaves on the upper end of the bucket arm; a boom line leading from the platform over one of the sheaves on the upper end of the bucket arm, thence around a sheave mounted on the bucket arm between the ends thereof, thence back over one of the sheaves on the upper end of the bucket arm, thence around the sheave supported on the platform, thence over one of the sheaves on the upper end of the bucket arm, with its outer end attached to the lower end of the bucket arm; and means on the platform for hauling in the boom line.

3. Apparatus of the character described, including; a platform; a boom pivotally attached to the platform; a bucket arm pivotally attached to the outer end of the boom, said pivotal attachment being below the upper end of said bucket arm; a bucket mounted on the lower end of the bucket arm; a loading line attached to the bucket; means on the platform for hauling in the loading line; a sheave on the upper end of the bucket arm; a boom line leading from the platform over the sheave on the upper end of the bucket arm, and so woven as to provide two points of attachment to the bucket arm, one at the lower end thereof, and one at a point intermediate the ends thereof; and means on the platform for hauling in the boom line.

4. Apparatus of the character described, including; a platform; a boom pivotally attached to the platform; a bucket arm pivotally attached to the outer end of the boom, said pivotal attachment being below the upper end of said bucket arm; a bucket mounted on the lower end of the bucket arm; a loading line attached to the bucket; means on the platform for hauling in the loading line; a sheave supported on the platform; a plurality of sheaves on the upper end of the bucket arm; two boom line attachments to the bucket arm, one at the lower end thereof, and one at a point intermediate the ends thereof, one of said attachments carrying a sheave; a boom line leading from the platform over one of the sheaves on the upper end of the bucket arm, thence around the sheave carried by one of the boom line attachments on the bucket arm, thence back over one of the sheaves on the upper end of the bucket arm, thence around the sheave supported on the platform, thence over one of the sheaves on the upper end of the bucket arm, with its outer end attached to the other boom line attachment on the bucket arm; and means on the platform for hauling in the boom line.

5. Apparatus as claimed in claim 1, in which the outer end of the boom line is attached directly to the lower end of the bucket arm.

6. Apparatus as claimed in claim 2, in which the outer end of the boom line is attached directly to the lower end of the bucket arm.

7. Apparatus as claimed in claim 3, in which the attachment of the boom line at the lower end of the bucket arm is made directly to said lower end of said bucket arm.

8. Apparatus as claimed in claim 4, in which the attachment of the boom line at the lower end of the bucket arm is made directly to said lower end of said bucket arm.

9. Apparatus as claimed in claim 1, in which the bucket is pivotally mounted on the lower end of the bucket arm, and in which the outer end of the boom line is attached to the bucket, tension on said boom line tending to rotate the bucket to dumping position.

10. Apparatus as claimed in claim 2, in which the bucket is pivotally mounted on the lower end of the bucket arm, and in which the outer end of the boom line is attached to the bucket, tension on said boom line tending to rotate the bucket to dumping position.

11. Apparatus as claimed in claim 3, in which the bucket is pivotally mounted on the lower end of the bucket arm, and in which one of the attachments of the boom line to the bucket arm is effected by means of attachment to the bucket, tension on said boom line tending to rotate the bucket to dumping position.

12. Apparatus as claimed in claim 4, in which the bucket is pivotally mounted on the lower end of the bucket arm, and in which one of the attachments of the boom line to the bucket arm is effected by means of attachment to the bucket, tension on said boom line tending to rotate the bucket to dumping position.

13. Apparatus as claimed in claim 1, in which the bucket is pivotally mounted on the lower end of the bucket arm, the outer end of the boom line attached directly to the lower end of the bucket arm, and a dump line provided connecting the bucket to the boom, said dump line operating to rotate the bucket to dumping position when the bucket arm is extending to a predetermined position.

14. Apparatus as claimed in claim 2, in which the bucket is pivotally mounted on the lower end of the bucket arm, the outer end of the boom line attached directly to the lower end of the bucket arm, and a dump line provided connecting the bucket to the boom, said dump line operating to rotate the bucket to dumping position when the bucket arm is extended to a predetermined position.

15. Apparatus as claimed in claim 3, in which the bucket is pivotally mounted on the lower end of the bucket arm, in which the attachment of the boom line at the lower end of the bucket arm is made directly to said lower end of said bucket arm, and a dump line provided connecting the bucket to the boom, said dump line operating to rotate the bucket to dumping position when the bucket arm is extended to a pre-determined position.

16. Apparatus as claimed in claim 4, in which the bucket is pivotally mounted on the lower end of the bucket arm, in which the attachment of the boom line at the lower end of the bucket arm is made directly to said lower end of said bucket arm, and a dump line provided connecting the bucket to the boom, said dump line operating to rotate the bucket to dumping position when the bucket arm is extending to a pre-determined position.

17. Apparatus as claimed in claim 1, in which there is provided a snubber chain connecting the bucket arm to the boom to limit the outward extension of the bucket arm.

18. Apparatus as claimed in claim 1, in which there is provided a resilient snubber brace attached to the boom, and a snubber chain connecting the bucket arm to the boom to limit the outward extension of the bucket arm, said snubber chain passing over said snubber brace.

19. Apparatus as claimed in claim 4, in which there is provided a snubber chain connecting the bucket arm to the boom to limit the outward extension of the bucket arm.

20. Apparatus as claimed in claim 4, in which there is provided a resilient snubber brace attached to the boom, and a snubber chain connecting the bucket arm to the boom to limit the outward extension of the bucket arm, said snubber chain passing over said snubber brace.

In witness whereof, I have hereunto set my hand, this 3rd day of March, 1930.

JOHN W. PAGE.